(12) United States Patent
Chanquion et al.

(10) Patent No.: US 11,178,445 B2
(45) Date of Patent: Nov. 16, 2021

(54) METHOD OF COMBINING DATA

(71) Applicant: Bytedance Inc., Wilmington, DE (US)

(72) Inventors: Pierre Chanquion, London (GB); David Trevelyan, London (GB); Jason Storey, London (GB); Edmund Newton-Rex, London (GB)

(73) Assignee: BYTEDANCE INC., Wilmington, DE (US)

( * ) Notice: Subject to any disclaimer, the term of this patent is extended or adjusted under 35 U.S.C. 154(b) by 1 day.

(21) Appl. No.: 16/334,600

(22) PCT Filed: Sep. 19, 2017

(86) PCT No.: PCT/GB2017/052774
§ 371 (c)(1),
(2) Date: Mar. 19, 2019

(87) PCT Pub. No.: WO2018/051140
PCT Pub. Date: Mar. 22, 2018

(65) Prior Publication Data
US 2020/0162783 A1 May 21, 2020

(30) Foreign Application Priority Data
Sep. 19, 2016 (GB) ...................................... 1615934

(51) Int. Cl.
*H04N 21/43* (2011.01)
*H04N 21/242* (2011.01)
(Continued)

(52) U.S. Cl.
CPC ....... *H04N 21/4307* (2013.01); *H04N 21/242* (2013.01); *H04N 21/4341* (2013.01); *H04N 21/8113* (2013.01)

(58) Field of Classification Search
CPC ............. H04N 21/4307; H04N 21/242; H04N 21/4341; H04N 21/8113
(Continued)

(56) References Cited

U.S. PATENT DOCUMENTS

| | | | |
|---|---|---|---|
| 6,549,884 B1 | 4/2003 | Laroche et al. | |
| 2002/0099764 A1* | 7/2002 | Stern | G06Q 30/0247 709/203 |

(Continued)

OTHER PUBLICATIONS

Mike Senior; "How To Build Tracks Around Sampled Tunes"; Dec. 31, 2011; https://www.soundonsound.com/techniques/how-to-build-tracks-around-sampled-tunes.

*Primary Examiner* — Loi H Tran
(74) *Attorney, Agent, or Firm* — BakerHostetler (57) ABSTRACT

A method of combining data, the method comprising: receiving video data, the video data corresponding to recorded video having a video duration determined by a user; selecting backing audio data, the backing audio data corresponding to backing audio having a predetermined duration; determining a difference between the predetermined duration and the video duration; and modifying the backing audio data by adjusting the predetermined duration based on the video duration to create an adjusted predetermined duration, the adjusted predetermined duration being such that the backing audio and recorded video may be simultaneously output in synchronisation.

20 Claims, 2 Drawing Sheets

(51) Int. Cl.
*H04N 21/434* (2011.01)
*H04N 21/81* (2011.01)

(58) Field of Classification Search
USPC .......................................... 386/200
See application file for complete search history.

(56) References Cited

U.S. PATENT DOCUMENTS

| | | | |
|---|---|---|---|
| 2002/0134219 A1* | 9/2002 | Aoki | G10H 1/0025 |
| | | | 84/609 |
| 2003/0027489 A1* | 2/2003 | Kay | G09F 19/14 |
| | | | 446/397 |
| 2004/0221710 A1* | 11/2004 | Kitayama | G10H 3/125 |
| | | | 84/654 |
| 2006/0122842 A1* | 6/2006 | Herberger | G11B 27/034 |
| | | | 704/278 |
| 2009/0129752 A1* | 5/2009 | Yamada | H04N 21/4341 |
| | | | 386/241 |
| 2010/0257994 A1 | 10/2010 | Hufford | |
| 2014/0074459 A1 | 3/2014 | Chordia et al. | |
| 2015/0039646 A1* | 2/2015 | Sharifi | G06F 16/683 |
| | | | 707/769 |

* cited by examiner

METHOD OF COMBINING DATA

FIELD

The invention relates to a method of combining data in which some of the data corresponds to audio having a predetermined duration, and other of the data corresponds to video having a duration defined by a user. In an embodiment, the invention relates to combining video data relating to video captured by a user with audio data relating to audio of a predetermined duration.

BACKGROUND

Videos are often accompanied by music that was not originally recorded with the video. Such videos may have the original audio removed and replaced by a backing track to be played at the same time as the video, or a backing track may simply be played over the top of the video. Backing tracks are pieces of music of a certain length that are recorded or created in advance so that they may readily be added to video as an accompaniment.

In order for the backing track to fit with the video, the backing track should stop at the same time as the video. This avoids an abrupt stop that would be caused if the audio were to stop in advance of its intended finish. To achieve this, editing software may be used to manually edit the backing track to end at the same time as the video. This may be by cropping the backing track length to remove total sections, or adding a second backing track for example.

Manually editing the backing track is a time consuming process and requires specialised software to achieve, and often the result is not satisfactory as the video duration can vary so much. Further, any edits to the video would require further manual editing of the backing track to ensure synchronisation.

SUMMARY

An invention is set out in the claims.

A method of combining data is disclosed. The method comprises receiving video data, the video data corresponding to recorded video having a video duration determined by a user. Backing audio data is selected, the backing audio data corresponding to backing audio of a backing section having a predetermined duration. A backing section may also be known as a backing track. A difference between the predetermined duration and the video duration is determined, and the backing audio data is modified. The modification of the backing audio data comprises adjusting the predetermined duration based on the video duration to create an adjusted predetermined duration, the adjusted predetermined duration being such that the backing audio and recorded video may be simultaneously output in synchronisation. Also disclosed herein is a device arranged to carry out the method steps.

By virtue of the above steps, video and backing audio of a backing section may be output perfectly in synchronisation. The video may be captured by any device having video recording functionality, for example a smart phone or tablet. Once captured, a backing section to accompany the audio is automatically selected by software on the device. Since the backing section is created independently of, and at a different time to, the recording of the video, the duration of the backing section is inevitably different to that of the recorded video. The device therefore adjusts the backing section such that the video and backing audio are perfectly synchronised.

The perfect synchronisation is by way of the backing audio and video having an identical duration. As such, when the two are played through simultaneously, the two end at the exact same moment.

The adjustment of the backing section is such that the duration of the backing section is changed from its original duration. As extending or decreasing the duration of a piece of music, without adding or cutting out sections of music, may have an effect on the pitch of the music, it is desirable to adjust the duration of the backing section as little as possible. The selection of the backing section is such that the backing section duration has to be adjusted by a minimal amount to match the duration of the video. In this way, any musical distortion of the backing section is minimised.

The software may, in advance of automatic selection, provide the user with the option to filter to a specific music genre or other characteristic. In this case, the selection of a backing section is limited to those backing sections being of that music genre or characteristic.

After the backing section is adjusted to create perfect synchronisation with the video, the two may be played together in a seamless and endless loop. The looping of the backing section may be by way of repeatedly inserting the backing section into an audio buffer. Alternatively, the video and backing section may only loop a few times and be output to a single file containing a few loops of the two. Such a file may be sent to another device or shared online.

As well as adjusting a backing section to match the video, the original audio from the video may also be matched to a melody section. Such a melody section may be a melody section that is automatically associated with, and adjusted in the same manner as, the backing section. The matched audio from the video gains the pitch characteristics of the melody section by pitch alteration or correction methods. The matched audio can then be placed in the audio buffer along with the backing section so that the video, matched audio and backing section can be played endlessly together in a loop if desired.

After creation of the endless loop, filters may be selected which have the effect of changing the backing section and/or melody section. Such a filter selection may be performed by, for example, swiping left or right on a touchscreen display of the device. After a new filter is selected, the device automatically selects a new backing section and/or melody section in accordance with the filter such that an entirely different loop is output automatically. A user is therefore able to quickly and efficiently change the video loop that is output without having to capture any new data.

BRIEF DESCRIPTION OF THE DRAWINGS

Embodiments of the invention will now be described, by way of example, with reference to the drawings, of which.

Throughout the description and the drawings, like reference numerals refer to like parts.

DETAILED DESCRIPTION

In overview, a method is disclosed that combines video data of a user defined duration with audio data of a predetermined duration. As these two durations are inevitably different, the method adjusts the predetermined duration such that the audio data and video may be output to have the same duration. Once this is complete, the two may be played simultaneously together in an endless and seamless loop without any audio artefacts, such as silent sections.

The audio data may correspond to a backing section having a certain duration defined by the number of beats in the backing section and the beats per minute of the backing section. A beat of the backing section is a musical beat forming part of a musical bar. A number of musical beats make up a musical bar.

Figure 1:
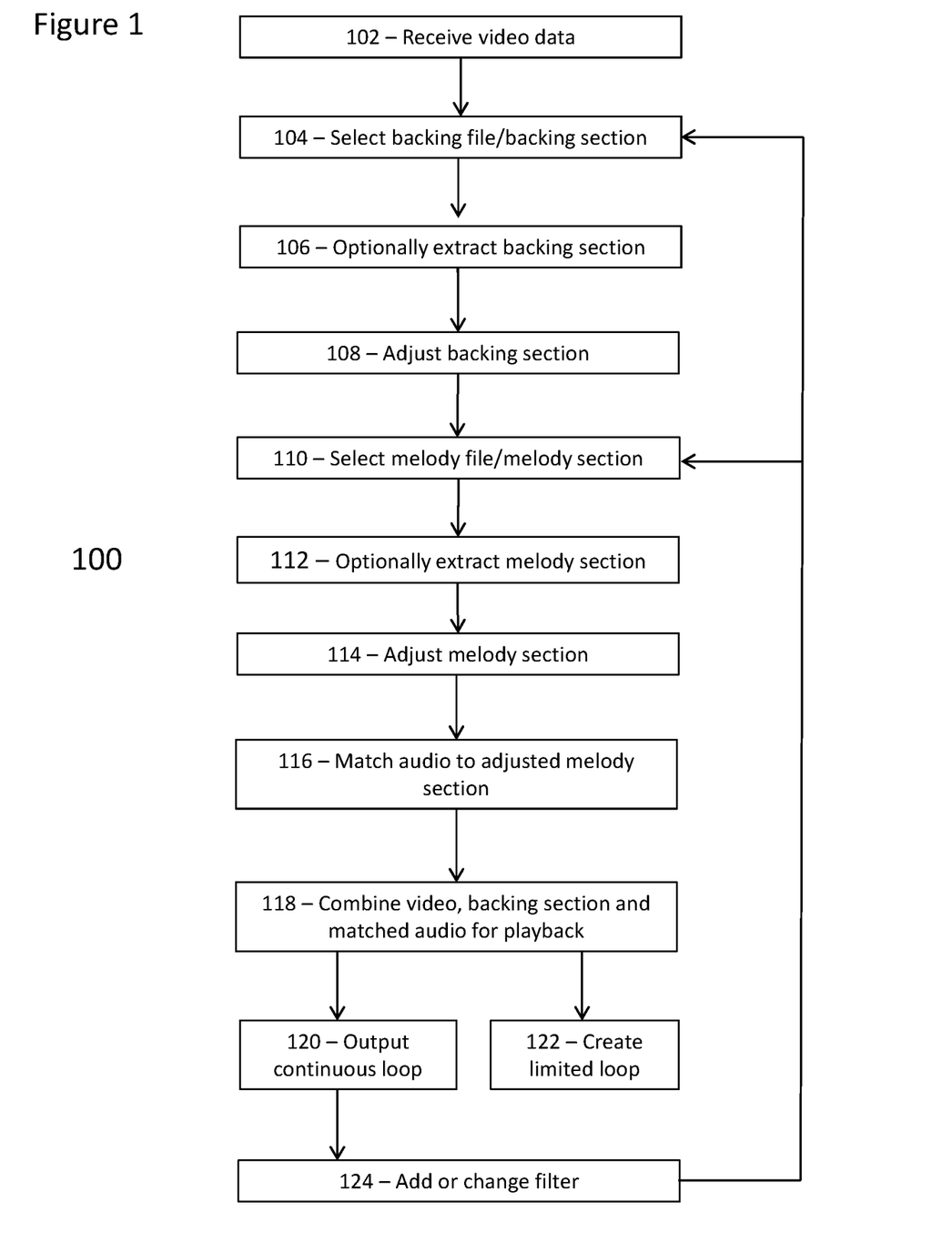
FIG. 1 shows a flow diagram of a method of combining audio data.

FIG. 1 shows a flow diagram 100 of the sequential steps to arrive at the combined audio to be output.

At step 102, video data is received at a device. The video data corresponds to a duration of recorded video including both visual and audio components. The device may receive the video data via an external device, or the device itself may have the functionality to record video. For example, a user of the device records or captures a video to create the video data. The device may be any type of device that is capable of recording video, for example a smart phone or tablet having an integral camera. Indeed, any device having a camera and video recording functionality may be used. The recorded video will capture a certain duration of footage that is defined by the user. The length of the footage may be controlled using conventional "start recording" and "stop recording" functions, or any other conventional manner known in the art. For example, the user may press a certain area of a touchscreen on the device, for example a red circle, that causes software on the device to begin recording using the device's camera and microphone. Pressing the same touchscreen area again may cause the software to stop recording the video and audio. Alternatively, pressing and holding the touchscreen area may cause the device's camera and microphone to record, and releasing the touchscreen area may cause the device's camera and microphone to stop recording.

The device has, in a memory, a list of pre-set backing sections. These backing sections are audio files having different durations. Each backing section is defined by a number of musical beats. Each backing section may be such that, musically speaking, repeated playing of the same backing section results in audio that "makes sense" to a listener. In other words, the musical end of a backing section (i.e. the last beat) is arranged to run into the musical beginning (i.e. the first beat) of the same backing section to create a continuous musical track.

Musical data stored on a device is usually stored in a compressed format. When musical data is created and exported for storage on a device, due to the compressed format the reading of this data by software on the device can lead to artefacts. This may be due to the decoding process executed on the musical data by the software, for example. Such an artefact may be the removal of end sections of the musical data. In practice, this means that a time period at the end of a stored backing section may be removed when decoded by software on the device. This results in the backing section stopping prematurely, or the backing section including a silent portion. Therefore, in order for a backing section to synchronise perfectly with video or other data, it is necessary to store the backing section on the device taking this problem into account.

Disclosed herein is a solution to this problem. At the end of the backing section, there may be an additional backing section that starts at the end point of the backing section. The additional backing section is an extra duration of time running after the end of the backing section. For example, the additional backing section may be the first beat of the backing section repeated, or indeed any number of beats or time duration. Each backing section may therefore be stored as backing data in a backing file having a number of beats defining a backing section, and an additional backing section having at least a portion of a beat after the musical end of the backing section. For example, the backing section may be 16 beats, and the additional backing section may be the first beat of the backing section repeated. Therefore, in this example, the backing file has 17 beats of music in total.

By having an additional backing section after the backing section, compression and decoding of the backing file will not result in removal of any part of the backing section. Instead, only the additional backing section will be affected. The backing file, once decoded, still includes the backing section in its entirety. The backing file having both a backing section and an additional backing section is optional however, and the backing file may only include a backing section.

At step 104, a stored backing section is automatically selected by the software from the list of pre-set backing sections. Optionally, before automatic selection, software on the device may allow a user of the device to specify a desired style of music by adding a filter from a plurality of different filters. The list of pre-set backing sections may include multiple groups of backing sections, each group having a different filter characteristic associated therewith, each filter characteristic corresponding to one of the plurality of different filters. Grouping the backing sections may be by way of including filter data as part of the backing data for each backing section. The filter data includes information regarding the filter characteristic of the backing section. Backing sections sharing the same filter data, and therefore the same filter characteristic, are said to be in the same group of backing sections for the purposes of filtering. For example, the user may select a "rock" filter from the plurality of different filters. By selecting this filter, the automatic selection of a backing section is limited to backing sections in the group having the corresponding "rock" filter characteristic as filter data. The filtering may be presented by way of presenting the different filter options to a user in a drop-down menu, for example, however many other methods are possible. As another example, the filtering may be added or changed by a user "swiping" through screens of a touch screen display of the device, each screen corresponding to a different filter.

The duration of each backing section is determined based on the number of beats in the backing section and the backing section's beats per minute (BPM) by dividing the number of beats by the BPM, as would be understood. The BPM value is the number of musical beats that would be output if the backing section were played for a minute. For example, if a backing section has a BPM of 60 and has 10 beats, the duration of the backing section is 10 seconds.

Software on the device automatically determines the most appropriate backing section to select based on the duration of the footage defined by the video data at step 102. In the case that each backing section is part of a backing file including an additional backing section as well, for the purposes of step 104 the device makes the automatic determination based on the backing section duration only. As the duration of the video footage is not predetermined and may be any length, the backing section selected by the software inevitably has a backing section duration that does not perfectly match the duration of the video footage. The automatically selected backing section is therefore the backing section with a backing section duration closest to the duration of the video footage.

Optionally, software on the device may limit the duration of video footage to a predetermined maximum duration, for example 10 seconds. The software would therefore allow recordal of video up to 10 seconds, and automatically stop recording video after 10 seconds of video have been recorded.

Alternatively, the selected backing section may be the backing section with a backing section duration that is closest in duration to a certain fraction of the video footage duration. The fraction may be such that an integer multiple of the backing section duration approximates, or is close to, the total duration of the footage. Conversely, the fraction may be such that an integer multiple of the total footage duration approximates, or is close to, the backing section duration of the selected backing section. For example, the selected backing section may be the backing section in the list that has a backing section duration closest to half the total video footage duration, such that twice the backing section duration most closely approximates the total footage duration. As another example, the selected backing section may be the backing section in the list that has a backing section duration closest to twice the total video footage duration, such that half the backing section duration most closely approximates the total footage duration. The fraction is therefore any fraction in which the numerator is 1 and the denominator is an integer other than 1, for example ½, ⅓, ¼ etc., or the denominator is 1 and the numerator is an integer other than 1, for example 2/1, 3/1, 4/1 etc. In other words, the ratio of backing section duration to total footage duration is 1:n or n:1, where n is an integer greater than 1.

In any of the above examples, the automatic selection of the backing section may not be the backing section with a backing section duration closest in duration to the footage duration or fraction of the footage duration. Instead, the automatic selection may be the selection of a backing section having a backing section duration within a threshold percentage of the footage duration. For example, the backing section duration may be 90% of the footage duration, and therefore the backing section with that backing section duration may be selected. The threshold percentage could be any percentage, but ideally is close to 100% of the footage duration. For example, the threshold may be plus or minus 10% of the footage duration, or in other words within 10% of the footage duration. The automatic selection may also be based on the backing section duration being within a threshold percentage of a fraction of the footage duration. The fraction is the same as the fraction previously described. In the case that there are multiple backing sections having backing section durations within the threshold, software on the device may choose one at random. Although a threshold of within 10% has been discussed, this is only an example and other percentage thresholds may be used.

Although the threshold above is mentioned in terms of a percentage of the footage duration, other thresholds may be used. For example, the backing section may be selected on the basis of requiring a BPM adjustment within a threshold range. The backing section may only be selected if the required BPM adjustment is plus or minus 5 BPM of its original BPM, or in other words within 5 BPM of its original BPM. As an example, if the backing section has a BPM of 100 and the desired BPM is 104 (discussed in relation to step 108 below), then that backing section may be chosen as the BPM adjustment is within 5 BPM of the original 100 BPM. If the backing section has a BPM of 90 however, a different backing section would be chosen as 90 BPM requires an adjustment of more than 5 BPM to reach the desired BPM in this example. Although a threshold of within 5 BPM has been discussed, this is only an example and other BPM thresholds may be used.

In an embodiment, the number of musical beats of each backing section is the same. In this case, only the difference in BPMs of the backing sections causes the backing section durations to be different. For example, if every backing section has 16 musical beats, then a backing section having a BPM of 60 would have a backing section duration of 16 seconds, and a backing section having a BPM of 100 would have a backing section duration of 9.6 seconds. Therefore, for this embodiment, a "BPM" is effectively the same as a "duration" for the purposes of automatically selecting a backing section.

If the number of musical beats of each backing section is the same, a desired BPM for the backing section may be determined based on the duration of the video footage. For example, if the video footage has a duration of 9 seconds, then with the knowledge that every backing section is 16 beats, the desired BPM of the backing section is therefore the BPM that makes 16 beats last 9 seconds. In this case, the desired BPM is therefore 106.7. Therefore, although the backing section is still automatically selected at step 104 based on having a backing section duration closest to the duration of the footage (or a certain fraction of the footage duration), in this embodiment this may be achieved by automatically selecting the backing section that has a BPM closest to the desired BPM. In this example, the backing section selected would be that having a BPM closest to 106.7 as this would mean that the backing section duration is closest to the footage duration.

In general, in the case that the number of musical beats of each backing section stored on the device is the same, the duration of the video footage allows calculation of a desired BPM. The backing section automatically selected at step 104 is the backing section with a BPM closest to the desired BPM. This is therefore the backing section with a backing section duration closest to the footage duration. In the same manner as previously described, the selected backing section may instead be the backing section with a BPM that is closest to a certain fraction of the desired BPM. The fraction may be such that an integer multiple of the backing section BPM approximates, or is close to, the desired BPM.

Conversely, the fraction may be such that an integer multiple of the desired BPM approximates, or is close to, the backing section BPM.

In another embodiment, at least some backing section have both different BPMs and different numbers of beats. The differences in duration of the backing sections are therefore caused by both the different number of beats and the different BPMs.

Generally speaking, regardless of whether the backing sections have the same or different numbers of beats, the automatic selection of the backing section may be discussed in terms of durations. As an example, the footage may have a total duration of 10 seconds. The list of pre-set backing section may include a backing section having a 7 second backing section duration (defined by the backing section's BPM and number of beats), and another backing section having a 9 second backing section duration. The device therefore automatically selects the backing section having the 9 second backing section duration as this is closer to the total footage duration. 9 seconds is 90% of 10 seconds, whereas 7 seconds is only 70% of 10 seconds. Therefore, 9 seconds represents a percentage that is closer to 100% of the total footage duration.

As another example, the footage may have a total duration of 10 seconds, and the list of pre-set backing sections may include a backing section having a 7 second backing section duration, and a backing section having a 4 second backing section duration. Although the backing section having the 7 second backing section duration is closer to the total footage duration, in this case the device automatically selects the backing section having the 4 second backing section duration, as this duration is closer to ½ the total footage duration (5 seconds). 4 seconds is 80% of 5 seconds, whereas 7 seconds is only 70% of 10 seconds. Therefore, 4 seconds represents a percentage that is closer to 100% of the fraction of the footage duration.

As another example, the footage may have a duration of 5 seconds, and the list of pre-set backing sections may include a backing section having a backing section duration of 8 seconds, and a backing section having a backing section duration of 11 seconds. Although the backing section having the 8 second backing section duration is closer to the footage duration, in this case the device automatically selects the backing section having the 11 second backing section duration, as this is closer to 2/1 the footage duration (10 seconds). 11 seconds is 110% of 10 seconds, whereas 8 seconds is 160% of 5 seconds. Therefore, 11 seconds represents a percentage that is closer to 100% of the fraction of the footage duration.

In the embodiment in which the backing sections all have the same number of beats, the automatic selection is based on BPM as discussed above. For example, the footage may for example have a duration of 9 seconds. If the backing sections have, for example, 16 beats, a desired BPM is calculated as 106.7 as this is the BPM that would make 16 beats last 9 seconds. The list of pre-set backing sections may include a backing section having a BPM of 90, and a backing section having a BPM of 110. The device therefore automatically selects the backing section having the BPM of 110 as this is closer to the desired BPM. 90 is 84% of 106.7, whereas 110 is 103% of 106.7. Therefore, a BPM of 110 represents a BPM that is closer to 100% of the desired BPM. In other words, the duration of the backing section of the 110 BPM backing section is closer to the total footage duration. The same principles discussed above apply equally to this embodiment as well. As such, the backing section chosen may have a BPM that is less than the desired BPM, i.e. the backing section duration is longer than the total footage duration, or may have a BPM that is closer to the fraction of the desired BPM, i.e. the backing section duration is closer to the fraction of the total footage duration.

By automatically a selecting backing section that has a backing section duration, by way of BPM or otherwise, that is as close as possible to 100% of the total footage duration, or 100% of the fraction of the total footage duration, the amount by which the selected backing section needs to be adjusted is minimised, as will be described in more detail in relation to step 108.

The list of pre-set backing sections may have multiple backing sections of the same backing section duration, in which case the device selects one of these backing sections at random.

In the case that the backing file optionally includes an additional backing section as well as the selected backing section, the method proceeds to the step 106. At step 106 the backing section is extracted from the backing file. The device, or software on the device, may extract the backing section from the backing file by sampling the stored backing file at a certain sample rate. The skilled person would understand the sample rate to be the number of samples taken per time period, typically per second. Based on knowing the number of beats in the backing section and the BPM of the backing section, the device can calculate the duration of the backing section as previously discussed. By knowing the duration of the backing section, the device can calculate the number of samples that must be taken in order to reach the end of the backing section (without going into the additional backing section). As an example, if the device samples a backing file at 50,000 samples per second, and if the backing section of the backing file is calculated to be 5 seconds long, 250,000 samples are taken to extract the backing section from the backing file.

In the case that every backing section has the same number of beats, the BPM effectively determines the duration, as previously discussed, and extraction would therefore mean extracting a predetermined number of beats from a backing file. For example, if every backing file contains backing data for 17 beats, with the first 16 beats being the backing section, based on the BPM of the backing section the duration of the first 16 beats can be calculated. The device therefore takes the number of samples required to extract the duration corresponding to the first 16 beats.

Extraction may instead be by way of removing all backing data after a certain point. For example, if the backing file has backing data for 17 beats and the backing section is 16 beats of that backing data, the software removes all data after the 16 beats. In the case that the backing sections have different numbers of musical beats, the software extracts the backing section by removing backing data after a certain point marking the end of the backing section.

After extraction of the backing section from the backing file, the method then proceeds to step 108 in which the backing section duration of the automatically selected backing section is adjusted.

At step 108, after a backing section is automatically selected, a difference between the backing section duration of the selected backing section and the footage duration is determined. Such a difference is due to the footage duration being controlled by a user in an analogue manner, and the backing section durations being predetermined. Then, in response to determining a difference, the backing section duration is adjusted to match the duration of the footage, or to match the fraction of the duration of the footage.

As an example, the backing section may have a backing section duration of 9 seconds, and the recorded footage may have a total duration of 10 seconds. The backing section is therefore adjusted so that the backing section duration is also 10 seconds. This is achieved by "time-stretching" the backing section so that, in this particular example, the backing section plays at a reduced tempo to extend the backing section duration to 10 seconds. The adjustment of the backing section in this example is therefore a decrease in the BPM of the selected backing section.

Conversely, as another example the backing section may have a backing section duration of 10 seconds, and the recorded footage may have a total duration of 9 seconds. In this example, the backing section is adjusted to increase the tempo in order to condense the backing section duration down to 9 seconds. The adjustment of the backing section in this example is therefore an increase in the BPM of the selected backing section.

As another example, the backing section may have a backing section duration of 5 seconds, and the recorded footage may have a total duration of 10 seconds. In this example, the backing section is adjusted by repeating the backing section once such that two instances of the 5 second backing section play in succession. The adjustment of the backing section in this example is therefore a repeating of the backing section.

When the backing section is selected on the basis of having a backing section duration that is closest to the fraction of the total footage duration, the above examples work together. For example, the backing section may have a backing section duration of 5 seconds, and the footage may have a total duration of 10.6 seconds. In this case, the 5 second backing section is selected from the list as it is 94% of ½ the footage duration (5.3 seconds). The 5 second backing section is then time stretched to 5.3 seconds by decreasing the BPM, as previously discussed, and then repeated once to bring the total backing section duration to 10.6 seconds. In this example, both decreasing the BPM and repeating the "time-stretched" backing section are used to adjust the backing section to match the total footage duration. As would be understood, in other instances increasing the BPM before repeating may be appropriate instead if the selected backing section has a backing section duration that slightly exceeds, but most closely approximates, the fraction of the total footage duration.

Similarly, instead of repeating the selected backing section, the footage could be repeated instead. When the fraction is an improper fraction, for example, 2/1 (i.e. the backing section duration most closely approximates twice the total footage duration), the total footage duration would be repeated once and the selected backing section's BPM adjusted as necessary to match the backing section duration to the doubled footage duration.

The above steps therefore minimise the amount that the backing section needs to be adjusted. This is beneficial since altering the BPM of a pre-set backing section also alters the pitch of the music, therefore distorting the backing section from its original sound. If the BPM is significantly altered then the music begins to sound unpleasant to the user, and as such the above steps minimise BPM changes in a pre-set backing section.

Although the above examples discuss the situation in which the backing section is repeated, with or without BPM change, only once, it may be the case that the backing section needs to be repeated more than once. For example, if the backing section is selected on the basis that it has a backing section duration that is closest to ⅓ of the total footage duration, the backing section would be repeated twice (after any necessary tempo change), i.e. played three times in succession. Any number of repeats is possible, depending on the fraction closest to the selected backing section. Similarly, in the case of the fraction being an improper fraction, the footage could also be repeated any number of times to closely approximate the backing section duration.

At step 110, a melody section is selected. The device may have, in a memory, one or more melody sections associated with each backing section. Each melody section may be stored as melody data in a melody file. These melody sections are music having different durations and pitch, i.e. different melodies in the conventional meaning. Such melody sections may be formed of single notes, or may also or instead include chords. Each melody section has a number of beats and duration equal to that of the associated backing section. The BPM of the melody section is also the same as that of its associated backing section.

The selection of the melody section may be automatically performed by software on the device, or may be manually chosen by the user. In the case where the melody section is automatically selected, the selection may be made based on the backing section selected at step 104. Each backing section may have only a single melody section associated therewith, and therefore the selection of a specific backing section automatically selects a specific melody section, as only one melody section is available. Alternatively, each backing section may have a list of multiple melody sections associated therewith. In this case, the device may automatically select one of the melody sections from the list in a random manner, or a user input could be used to select a specific melody section from the list.

Optionally, the melody files may comprise an additional melody section as well as a melody section. The additional melody section is an extra duration of time running after the end of the melody section. The additional melody section corresponds to the additional backing section of the associated backing section, and is present for the same reasons as those given above for the additional backing section. For example, the additional melody section may also be the first beat of the melody section repeated, or indeed any number of beats or time duration to correspond to the additional backing section of the backing file.

In the case that the melody file optionally includes an additional melody section as well as the selected melody section, the method proceeds to step 112. After selection of the melody section, at step 112 the melody section is extracted from the melody file in the same way as for the backing section at step 106.

At step 114, the melody section is adjusted such that its duration is equal to its associated backing section (which was already adjusted at step 108). As a default, the selected melody section "fits" with its associated backing section by having the same BPM and number of beats. In other words, adjustment of the backing section also necessitates adjustment of the melody section in the same manner, as the melody section duration would otherwise no longer be in sync with the adjusted backing section. As such, the adjustment steps to the backing section set-out in step 106 are also applied to the associated melody section. This includes any repeating of the backing section, and therefore melody section, that may have been necessary to match the total duration of the footage. The melody section is therefore adjusted in the same manner as its associated backing section.

At step 116, the audio from the video footage is removed and matched to the selected, adjusted melody section. This may require repeating of the melody section or audio as previously described such that the durations of the two are equal. When the durations are equal, the matching may be achieved via conventional pitch correction or pitch modification means without losing sychronisation. Techniques for pitch correction or pitch modification are well known to the skilled person, and therefore such techniques will not be described in detail. The pitch correction modifies the audio taken from the video footage such that the audio has the same pitch as the melody section. The skilled person would be familiar with various pitch correction methods, and any appropriate method could be applied to match the audio from the video footage to the melody section. An example of pitch correction is vocoding, as the skilled person would understand. The output of step 116 is matched audio. The matched audio is the audio from the video matched to the pitch of the melody. If there are silent sections in the audio from the video, such silent sections would also be present in the matched audio.

At step 118, the video footage (without the original audio, and repeated if necessary to match the duration of the backing section as previously described), the backing section (repeated if necessary to match the duration of the video footage) and the matched audio of step 116 are combined for playback in a continuous loop. The looping will be described below in relation to FIG. 2.

At step 120, the looped (a) video, (b) backing section and (c) matched audio of step 116 may be output as a single endless and seamless loop on the device that recorded the video at step 102. As the backing section, matched audio and video are synchronised by the preceding steps, the backing section, matched audio and video maintain synchronisation as they are seamlessly looped.

Removal of audio artefacts by steps 106 and 112 ensures that the backing section and melody section, when extracted from the respective backing file and melody file, are unaffected by artefacts that may be introduced. Such artefacts may be present due to the decoding of compressed files for example, as previously discussed. In short, steps 106 and 112 prevent unwanted sections or portions from influencing the backing section and melody section respectively.

The removal of audio artefacts, which may be present at the end of a backing section and/or melody section, ensures that there are no silent or other unwanted sections in the loop. Silence in a loop would lead to the resultant loop sounding discontinuous and interrupted, even if synchronisation with the video were maintained. Therefore, removal of the silent sections improves the continuous and seamless nature of the loop.

Further, if such artefacts result in data being added to, or removed from, the end of the backing section or melody section, for example data corresponding to an extra beat of silence, then the duration of these sections would also be affected such that looping may cause synchronisation issues between the video and backing/melody. As the skilled person would understand, such artefacts cause the resultant loop to lose synchronisation over time due to a mismatch in durations. The removal of such audio artefacts therefore also ensures that synchronisation between video and audio is maintained.

Alternatively, at step 122, the looped video, backing section and matched audio of step 116 may be looped only a set number of times as a limited loop. The limited loop may be a single video file that outputs the loop three times, for example, before stopping, but any number of times is possible, including outputting only once. The limited loop file may be played on the device that recorded the video at step 102, or may be uploaded to an external device or platform. For example, the file may be uploaded to a social media platform. As another example, the limited loop file may be sent to a different device for playback at the different device.

Alternatively, the specific software settings that were used to arrive at the endless and seamless loop at step 118 may be sent to another device having the same software, along with the video footage for output on the other device. In this manner, the software on the other device can cause the other device to output the endless and seamless loop, or create the limited loop of step 122, based on receiving the settings and video footage alone.

It should be noted that the steps 110 to 116 are optional, and therefore the backing section and video (with or without original audio) may be the only elements that are looped at steps 118 or 120.

In the case that the backing sections and melody sections are originally stored on the device in backing files and melody files that do not comprise additional backing sections or melody sections respectively, the steps 106 and 112 are optional.

Although at step 104 the user may optionally add a filter (which may, for example, specify a particular style of music as previously discussed), at step 124 optionally the software may additionally or instead allow the user to add or change a filter after step 120. In other words, the user may change the backing section, and therefore the melody section, after the process has reached step 120 and the looped (a) video, (b) backing section and (c) matched audio of step 116 are output as a single endless and seamless loop, based on adding or changing a filter. Adding or changing a filter may be by way of the software presenting the user with the option to choose a filter after or as part of step 120. This may be by any conventional means, for example by displaying a button on the display of the device with a filter option, or by providing a drop-down menu containing a selection of different filter options. Such options may include music style filters such as "rock", "classical" or "pop", however many different filters can be presented. In an embodiment, adding or selecting a filter may be by way of a gesture on a touchscreen display of the device. For example, swiping left or right may add or change the filter, as previously described.

In the case that the user is only presented with the option to add a filter after step 120, the selection of a backing section may have been based on a default filter. For example, without user input the default filter may limit the automatic selection of backing sections to those backing sections having a certain filter characteristic, i.e. having certain filter data as part of the backing data, for example backing sections with a "rock" filter characteristic. Alternatively, if a filter was not added before step 120 then the process may have included all stored backing sections as possible selections, the specific backing section being selected based on its backing section duration as previously discussed.

When a filter is added or changed, the process restarts again at step 104 and a different backing section is automatically selected. The selection of the different backing section is based on automatically selecting a backing section from a group of backing section having the same filter characteristic, the filter characteristic corresponding to the added filter. For example, when a "classical" filter is added, the process starts again at step 104 and automatically selects a backing section from the group of backing sections having the "classical" filter characteristic. Although a "group" of backing sections is described, there may only be a single backing section having each filter characteristic, and therefore changing or adding the filter may mean automatically selecting the backing section having the filter characteristic corresponding to the filter.

Although changing the backing section has been described as changing the melody section as well, instead the filter may only apply to the melody section and therefore this would be changed in isolation from the backing section. In this case, when a filter is changed or added, the process restarts again at step 110 and a different melody section is selected. The selection of a different melody section is based on automatically selecting a melody section having a filter characteristic corresponding to the chosen filter. In this case, the melody data of each melody section also comprises filter data including information regarding the filter characteristic of the melody section.

Step 124 therefore automatically restarts the process at an earlier point to provide a very different output at step 120. This allows a user to quickly and efficiently change the backing section and/or melody section by simply adding or changing the filter. The output may therefore be changed automatically based on the desires of a user, without having to capture any new data. A plurality of different outputs can therefore be provided based on the same captured data.

Although the backing files, backing data, backing sections, melody files, melody data and melody sections are described as being stored on the device that outputs the synchronised video and audio of FIG. 1, such data may instead be stored on an external device or server and retrieved by the device to execute the steps at the appropriate time. For example, step 104 could include selecting a backing section from a list of pre-set backing sections stored on an external device via a data connection with the external device, and step 110 could include selecting a melody section from a list of pre-set melody sections stored on an external device via a data connection with the external device.

As another example, a first device may capture the video, and a second device may carry out all of steps 102-124. Alternatively, the second device could only perform steps 102 to 118, and the first device could perform step 120. In this case, the second device performs step 102 by way of being sent the captured video from the first device.

Figure 2:
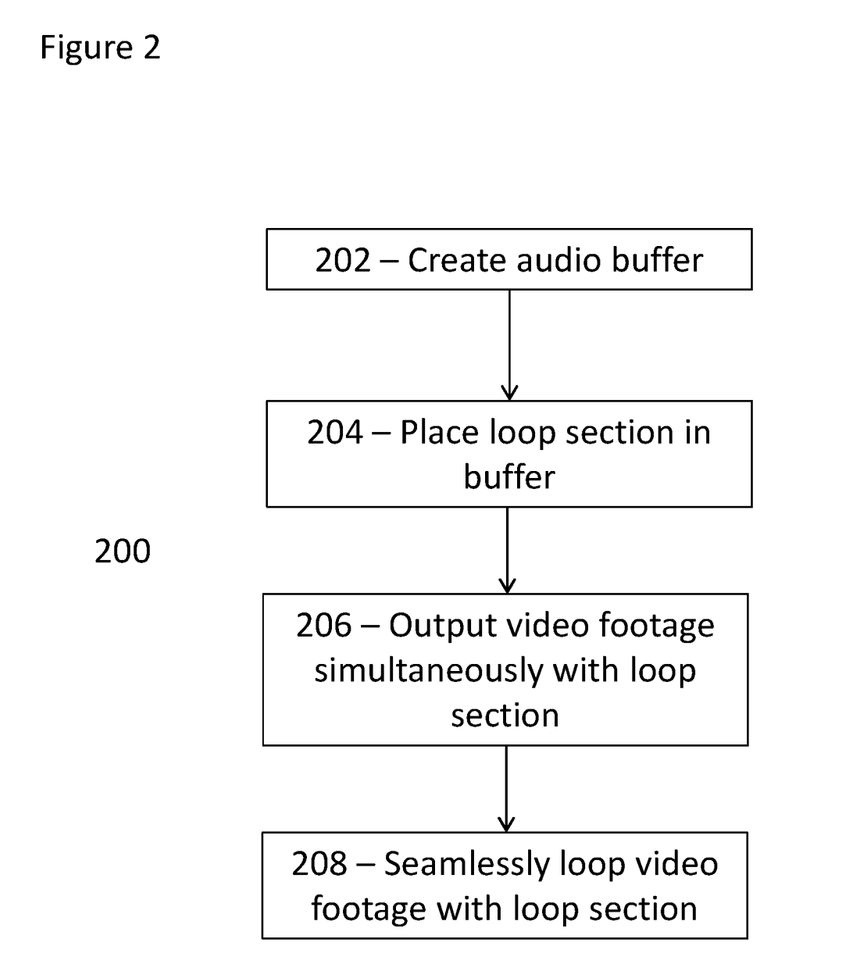
FIG. 2 shows a flow diagram of a method of creating an audio and video loop.

FIG. 2 is a flow diagram 200 showing the combination and looping of the video footage, the backing section and optionally the matched audio of step 110 in more detail. The steps 102 to 110 of FIG. 1 result in video and audio being synced. Therefore, if both the video and audio are output at the same time, the two would be synchronised and finish at the same instant. However, as this output may have a relatively short duration (depending on the duration of the video footage of step 102), it may be desirable to repeat the synced video and audio a number of times. Repeating music has the effect of increasing the music's appeal, as a person tends to like hearing the same thing over and over in the case of music. In other words, repeating music makes the music more "catchy".

One way to achieve this is to create a single file in which the synced video and audio is repeated a fixed number times. The result could be, for example, putting the synced video and audio data together three times in succession, to create a single file output that is three times as long. This would result in a longer output that maintains synchronisation between the video and audio as both have the same durations. However, many devices implement short silent sections at the beginning or end of audio that would mean that repeating the audio would not be seamless, as the silent sections would break the flow. Silent sections can be artefacts of some looping software systems, or can be introduced during export or compression of an audio file (as previously explained). As well as the issue of silent sections, the resultant file would be larger (in this instance, three times as large) than the original data, therefore taking up extra memory storage in the device.

A disadvantage of creating a single file in which the synced video and audio is repeated a fixed number of times is that this does not result in playback of an endless loop. The user would have to re-open the file at the end of its playback in order to hear/see it again. This is not the case for an endless loop, which continues playing until stopped manually by a user.

Looping an audio track in a conventional manner can lead to issues in the loop since, as explained above, silent sections at the beginning and/or end of the loop may be created. Some conventional manners of looping an entire audio track would therefore result in an imperfect, non-seamless loop. This issue becomes greater when the audio is synced with video, since the audio may slowly lose time with the video due to the silent sections. Other artefacts may also be present in audio loops that are created using some conventional methods.

The process of FIG. 2 results in a seamless and endless loop while minimising the storage of extra data and without losing synchronisation with the recorded footage. The process is automatic, and no user intervention is required to produce the seamless loop.

At step 202, an audio buffer is created. The audio buffer may be created by software resident on the device that recorded the video.

At step 204, the backing section and the matched audio of step 110 are placed simultaneously in the audio buffer to create a loop section. The loop section may include the backing section repeated to match the duration of the video footage and matched audio. The loop section comprises a backing section and matched audio synchronised in time and ending at the same point in time. A continuous and seamless loop can therefore be created by placing the loop section in the audio buffer in succession as many times as desired. Repeatedly placing the loop section in the audio buffer creates an endless loop.

At step 206, the recorded footage (without original audio) may be output simultaneously with the loop section.

In the case that the footage duration is less than the duration of the loop section, the recorded footage (without original audio) may be repeated in a conventional manner multiple times for every single output of the loop section. For example, if the duration of the loop section is double that of the footage, the footage may be repeated twice for every one play-through of the loop section.

As the duration of the loop section is exactly equal to the recorded footage duration, or exactly equal to a multiple of the recorded footage duration, the two may be output perfectly in sync. The continuous repeating of the recorded footage (without original audio), together with continuously placing the loop section in the audio buffer, creates a seamless and endless loop of the video and audio that may be looped as many times as desired.

Alternatively, at step 208, the recorded footage (without original audio) and the loop section may be simultaneously output to loop seamlessly a set number of times. For example, the loop section may be placed in the buffer three times, to be played with the recorded footage (without original audio) three times on repeat. This fixed loop may be rendered as a file for downloading on the same device, sending to another device or uploading to a server. Such a server may host a social media platform, for example, and therefore the uploading may be uploading the fixed loop to social media.

As can be seen, by simply recording a video that includes audio, an entire song can be created quickly and automatically, without requiring any further input from a user. A backing section is automatically selected and adjusted such that the backing section and audio are perfectly in sync, and a melody section is also automatically selected to be used for pitch correction of the audio. The result is an output that has backing and melody perfectly in synchronisation and able to be played a fixed or unlimited number of times. The output also includes video perfectly in synchronisation with the backing and audio, such that the process also automatically creates a music video.

The various methods described above may be implemented by a computer program product. The software resident on the device that captured the video is an example of such a computer program product. The computer program product may include computer code arranged to instruct a computer or the device to perform the functions of one or more of the various methods described above. The computer program and/or the code for performing such methods may be provided to an apparatus, such as a computer or the device, on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer or the device may be configured in accordance with such code to perform one or more processes in accordance with the various methods discussed herein. In one arrangement the apparatus comprises a processor, memory, and a display. Typically, these are connected to a central bus structure, the display being connected via a display adapter. The system can also comprise one or more input devices (such as a mouse and/or keyboard) and/or a communications adapter for connecting the apparatus to other apparatus or networks, such as the server 106 and the network 104. In one arrangement the database resides in the memory of the computer system. Such an apparatus may take the form of a data processing system. Such a data processing system may be a distributed system. For example, such a data processing system may be distributed across a network.

The invention claimed is:

1. A method of combining data, the method comprising:
   receiving video data, the video data corresponding to recorded video having a video duration determined by a user, the video data including recorded audio;
   selecting backing audio data, the backing audio data corresponding to backing audio having a predetermined duration;
   determining a difference between the predetermined duration and the video duration;
   modifying the backing audio data by adjusting the predetermined duration based on the video duration to create an adjusted predetermined duration, the adjusted predetermined duration being such that the backing audio and recorded video may be simultaneously output in synchronization;
   selecting melody data associated with the backing audio data, the melody data corresponding to melody audio having a predetermined melody duration;
   modifying the melody data by adjusting the predetermined melody duration to create an adjusted predetermined melody duration, the adjusted predetermined melody duration being equal to the adjusted predetermined duration;
   matching the recorded audio to the modified melody data, wherein the matched recorded audio has a same duration and a same pitch as the modified melody section, and the matching the recorded audio to the modified melody data includes pitch correction or pitch modulation of the recorded audio; and
   combining the recorded video, the matched recorded audio and the modified backing audio for playback in a continuous loop, wherein the continuous loop comprises the recorded video, the matched recorded audio and the modified backing audio, and wherein the recorded video, the matched recorded audio and the modified backing audio maintain synchronization in time in the continuous loop.

2. The method of claim 1, wherein modifying the backing audio data comprises changing a beats per minute value of the backing audio data such that the adjusted predetermined duration is different to the predetermined duration.

3. The method of claim 1, wherein the adjusted predetermined duration is equal to the video duration, a fraction of the video duration or an integer multiple of the video duration.

4. The method of claim 3, wherein if the adjusted predetermined duration is equal to an integer multiple of the video duration, the method further comprises providing instructions to output the video an integer number of times such that the integer number output of the video duration is equal to the adjusted predetermined duration.

5. The method of claim 3, wherein if the adjusted predetermined duration is equal to a fraction of the video duration, the method further comprises providing instructions to output the audio an integer number of times such that the integer number output of the adjusted predetermined duration is equal to the video duration.

6. The method of claim 1, wherein selecting backing audio data comprises automatically selecting backing audio data from a plurality of different backing audio data, the different backing audio data corresponding to backing audio having different predetermined durations.

7. The method of claim 6, wherein the plurality of different backing audio data comprises two or more backing audio data having different filter data associated therewith, the filter data corresponding to a filter characteristic.

8. The method of claim 6, wherein the backing audio data is automatically selected based on the video duration.

9. The method of claim 6, wherein the automatically selected backing audio data is the backing audio data with a corresponding predetermined duration that is within a threshold percentage of the video duration.

10. The method of claim 6, wherein the automatically selected backing audio data is the backing audio data having a corresponding predetermined duration that is closest to the video duration.

11. The method of claim 1, wherein the predetermined melody duration is equal to the predetermined duration.

12. The method of claim 1, wherein the backing audio is repeatedly placed in an audio buffer to be continuously output.

13. The method of claim 1, wherein the backing audio data comprises a backing section and an additional backing section, the backing section being extracted from the backing audio data after the backing audio data is selected.

14. The method of claim 1, wherein the melody data comprises a melody section and an additional melody section, the melody section being extracted from the melody data after the melody data is selected.

15. The method of claim 1, further comprising storing the modified audio data and recorded video in a memory.

16. The method of claim 13, wherein the additional backing section is a first beat of the backing section.

17. The method of claim 1, wherein the adjusted predetermined duration is equal to a fraction of the video duration.

18. The method of claim 1, wherein selecting melody data associated with the backing audio data comprises selecting from among one or more melody data which is associated with the backing audio data and has different predetermined melody durations and pitches.

19. A non-transitory computer readable medium comprising computer readable code operable, in use, to instruct a computer to:
   receive video data, the video data corresponding to recorded video having a video duration determined by a user, the video data including recorded audio;
   select backing audio data, the backing audio data corresponding to backing audio having a predetermined duration;
   determine a difference between the predetermined duration and the video duration;
   modify the backing audio data by adjusting the predetermined duration based on the video duration to create an adjusted predetermined duration, the adjusted predetermined duration being such that the backing audio and recorded video may be simultaneously output in synchronization;
   select melody data associated with the backing audio data, the melody data corresponding to melody audio having a predetermined melody duration;
   modify the melody data by adjusting the predetermined melody duration to create an adjusted predetermined melody duration, the adjusted predetermined melody duration being equal to the adjusted predetermined duration;
   match the recorded audio to the modified melody data, wherein the matched recorded audio has a same duration and a same pitch as the modified melody section, and the matching the recorded audio to the modified melody data includes pitch correction or pitch modulation of the recorded audio; and
   combine the recorded video, the matched recorded audio and the modified backing audio for playback in a continuous loop, wherein the continuous loop comprises the recorded video, the matched recorded audio and the modified backing audio, and wherein the recorded video, the matched recorded audio and the modified backing audio maintain synchronization in time in the continuous loop.

20. A device for combining data, comprising:
   a processor;
   a memory in electronic communication with the processor, the memory having instructions stored thereon that are executable by the processor to cause the processor to:
      receive video data, the video data corresponding to recorded video having a video duration determined by a user, the video data including recorded audio;
      select backing audio data, the backing audio data corresponding to backing audio having a predetermined duration;
      determine a difference between the predetermined duration and the video duration;
      modify the backing audio data by adjusting the predetermined duration based on the video duration to create an adjusted predetermined duration;
      select melody data associated with the backing audio data, the melody data corresponding to melody audio having a predetermined melody duration;
      modify the melody data by adjusting the predetermined melody duration to create an adjusted predetermined melody duration, the adjusted predetermined melody duration being equal to the adjusted predetermined duration;
      match the recorded audio to the modified melody data, wherein the matched recorded audio has a same duration and a same pitch as the modified melody section, and the matching the recorded audio to the modified melody data comprises pitch correction or pitch modulation of the recorded audio; and
      combine the recorded video, the matched recorded audio and the modified backing audio for playback in a continuous loop, wherein the continuous loop comprises the recorded video, the matched recorded audio and the modified backing audio, and wherein the recorded video, the matched recorded audio and the modified backing audio maintain synchronization in time in the continuous loop.

\* \* \* \* \*